Oct. 21, 1952 K. W. GRAYBILL ET AL 2,615,095

SWITCHING APPARATUS

Filed Feb. 16, 1950 4 Sheets-Sheet 1

FIG. I

INVENTORS.
KENNETH W. GRAYBILL
HANS SENGEBUSCH

BY *Chas. W. Candy*

ATTORNEY

INVENTORs.
KENNETH W. GRAYBILL
HANS SENGBUSCH
BY
Chas. W. Candy
ATTORNEY

SWITCHING APPARATUS

Filed Feb. 16, 1950 4 Sheets-Sheet 3

INVENTORS.
KENNETH W. GRAYBILL
HANS SENGEBUSCH
BY
Chas. W. Candy
ATTORNEY

Oct. 21, 1952 K. W. GRAYBILL ET AL 2,615,095

SWITCHING APPARATUS

Filed Feb. 16, 1950 4 Sheets-Sheet 4

INVENTORS.
KENNTH W. GRAYBILL
HANS SENGEBUSCH

BY [signature]

ATTORNEY

Patented Oct. 21, 1952

2,615,095

UNITED STATES PATENT OFFICE 2,615,095

SWITCHING APPARATUS

Kenneth W. Graybill, Elmhurst, and Hans Sengebusch, Villa Park, Ill., assignors to Automatic Electric Laboratories, Inc., Chicago, Ill., a corporation of Delaware Application February 16, 1950, Serial No. 144,522

10 Claims. (Cl. 179—27.54)

The present invention relates in general to switching apparatus, and more particularly to improvements in switching apparatus of the pulse-operated type primarily for use in automatic and semi-automatic telephone systems.

It is an object of the invention to provide an improved switching arrangement whereby a plurality of subscribers' line circuits are associated with a multiple field of bare conductors, and a plurality of trunk circuits are associated with a plurality of pulse-operated switches, new and novel means being included so that any pulse-operated switch can connect its associated trunk circuit with any subscriber's line circuit.

Another object of the invention is to provide a novel pulse-operated switch for use in association with a multiple field of bare conductors so that connections of one set of circuit conductors can be established to another set of circuit conductors in a simple and efficient manner.

A further object of the invention is to provide a new and improved pulse-operated switch which is economical to manufacture and simple to maintain.

A still further object of the invention is to provide a new and novel means for preventing any pulse-operated switch of a plurality of pulse-operated switches from connecting with more than one circuit in a multiple field of bare conductors at one time.

Another object of the invention is to provide a new and novel pulse operated switch which can be controlled either as a line finder for outgoing calls from subscribers' line circuits or as a connector for incoming calls to subscribers' line circuits.

A feature of the invention, in addition to the inclusion of a simple line circuit multiple field consisting of bare conductors, resides in the also relatively inexpensive arrangement of the pulse-operated switch trunk circuit conductors. Each trunk circuit conductor comprises a metallic strip spanning the multiple field conductors but having no normal electrical connections therewith, and a conductor member depending from the metallic strip for a corresponding bare conductor of each line circuit in the multiple field, these depending conductor members being adapted to be pressed into electrical contact with the respective line circuit conductors in the multiple field. Each such conductor strip and its depending conductor members are stamped from a single piece of electrical conducting material, preferably spring stock, and, therefore, the strip serves to multiple the depending conductor members together so that no multiple wiring is required therefor.

Another feature of the invention relates to the provision of a switching arrangement wherein a plurality of sets of movable conducting elements representing a trunk circuit associated with a pulse-operated switch are arranged in co-operative relationship with a plurality of sets of stationary conducting elements representing respective line circuits, novel mechanical means controlled by the functioning of the pulse-operated switch being provided for urging a particular one of the sets of movable conducting elements into electrical contact with the corresponding set of stationary conducting elements.

A further feature of the invention concerns the employment of a novel means for locking the secondary shaft of the pulse-operable switch against rotation while the primary shaft of the switch is being rotated, the employment of novel means for freeing the secondary shaft for rotation after the primary shaft has been rotated, and the employment of novel means for rotatively locking the two shafts together while both shafts are being rotated as one unit.

A still further feature of the invention is the new and novel arrangement by which the two rotated shafts of the pulse-operable switch are further rotated as one unit for returning one of the shafts to its home, or normal, position and locking it against further rotation, and the new and novel arrangement by which the other shaft of the switch is further rotated to its home, or normal, position independent of the locked one shaft.

Another feature of the invention relates to the new and novel manner in which all of one group of contact actuators associated with the pulse-operable switch are simultaneously moved from respective first positons to respective second positions.

There are other objects and features of the invention having to do for the most part with the details in carrying out the foregoing. The various objects and features of the invention will be understood best from a further perusal of the description in connection with the accompanying drawings which show a preferred embodiment of the invention by way of example.

Referring now to the drawings.

Figure 1:
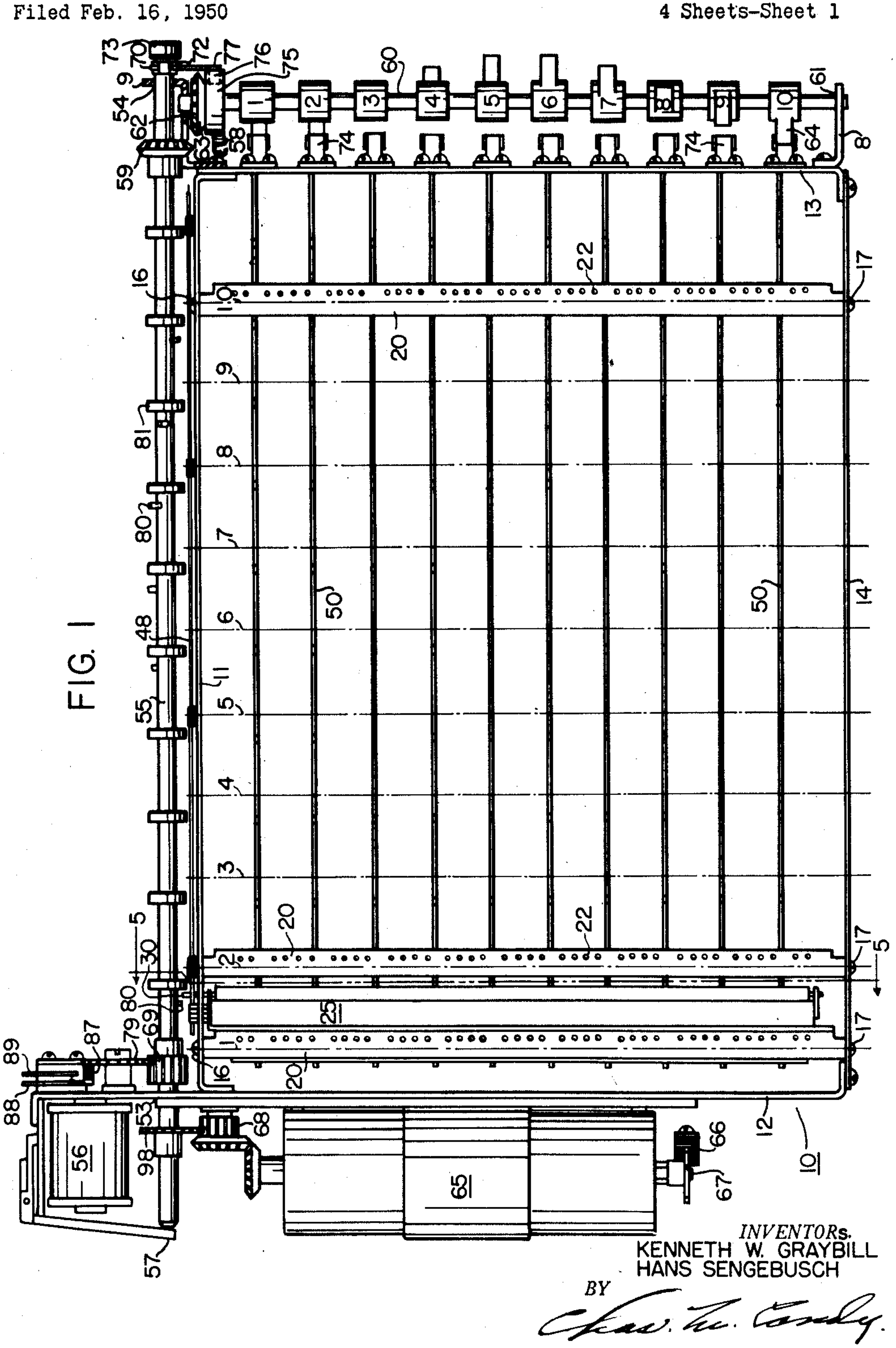
Figure 1 is a top view, in elevation, showing the group of vertically disposed subscriber line bare-wire multiple panels and the uppermost horizontally disposed switch unit.
Figure 5:
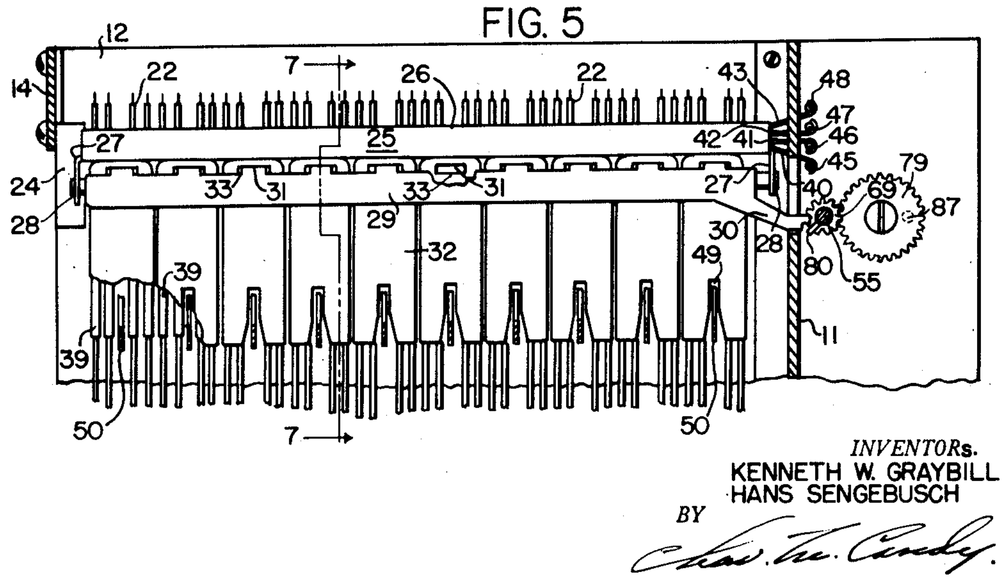

Figure 5 is a sectional view taken along the line 5—5 in Figure 1 showing the relationship of the first panel of vertically disposed bare-wire multiples with the uppermost switch unit, the horizontally disposed wiper assembly of the uppermost switch unit which is associated with the first panel of vertically disposed bare-wire multiples, the 10 vertically disposed actuators operable by the said wiper assembly, and the 10 horizontally disposed actuating bars operable by the cams associated with the uppermost switch unit.

Figure 6:
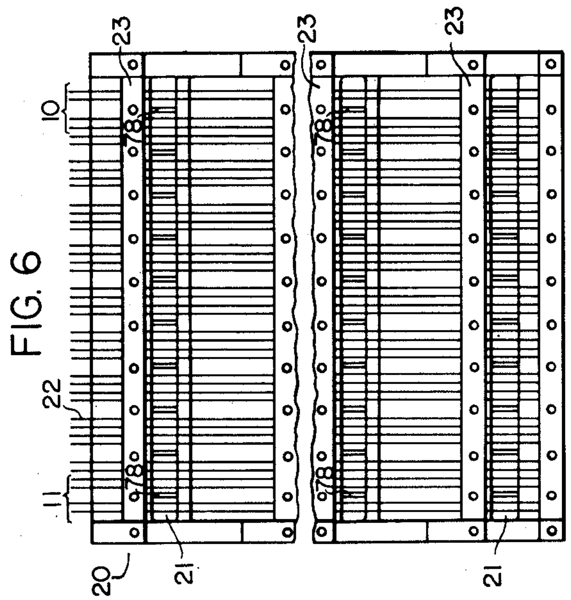

Figure 6 is a front view, in elevation, of one of the panels of vertically disposed bare-wire multiples showing the general structural arrangement of the frame proper and the manner in which the vertical bare wires are threaded through the horizontal members of the frame.

Figure 7:
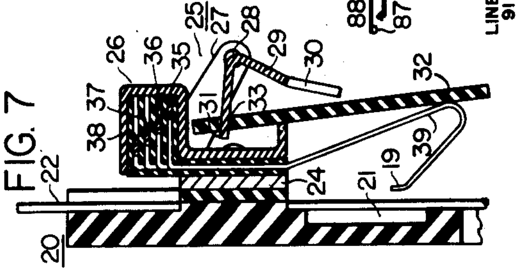

Figure 7 is a sectional view taken along the line 7—7 in Figure 5 showing the construction of one wiper assembly and its operating relationship to the conductors of the related bare-wire multiple panels.

Figures 8, 9:
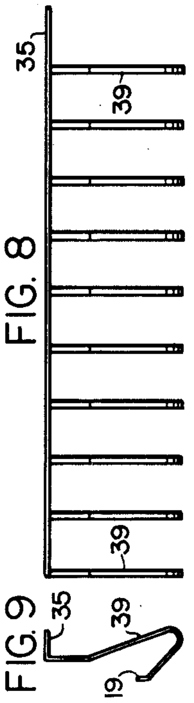

Figure 8 is a front view, in elevation, of one of the strip conductors of each wiper assembly, showing the one-piece construction of the conductor.

Figure 9 is a side view, in elevation, of the conductor of Figure 8, showing the formed contour of the 10 depending wiper members.

Figure 10:
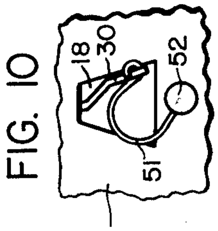

Figure 10 is an end view, in elevation, of the operating arm of the wiper assembly in its normal, or untripped, position.

Figure 11:
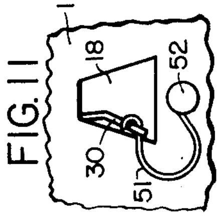

Figure 11 is an end view, in elevation, of the operating arm of the wiper assembly in its tripped, or operated, position.

Figure 12:
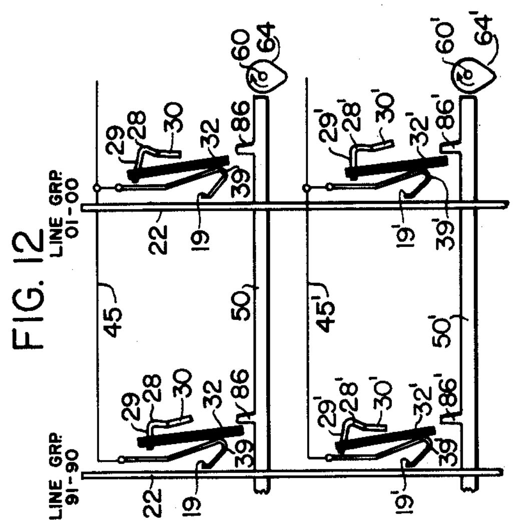

Figure 12 is a simplified diagram disclosing the general operating principles of the switch units.

Figure 13:
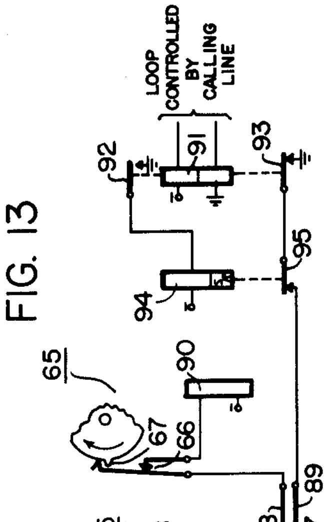

Figure 13 shows a typical self-interruption homing circuit arrangement for causing the automatic returning of an operated switch unit to its normal, or home, position.

Figure 2:
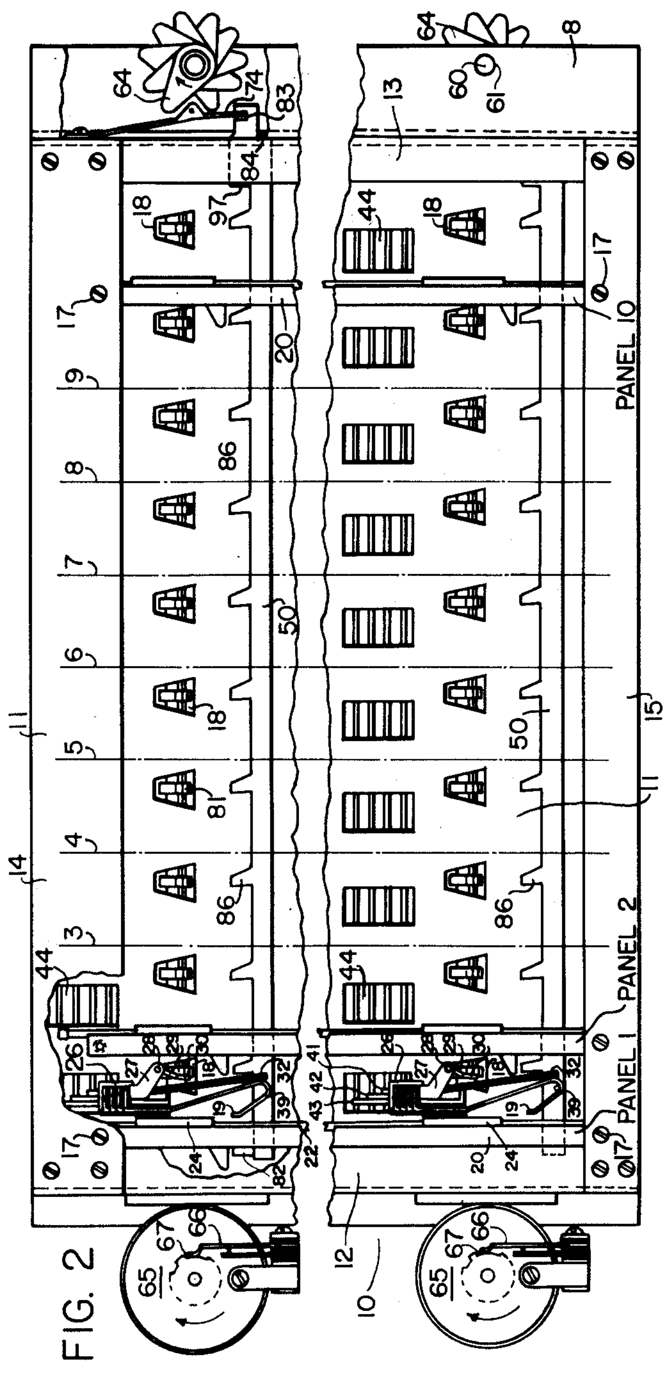
Figure 2 is a partial front view, in elevation, showing the uppermost and the bottom horizontally disposed switch units and also the panels of vertically disposed bare-wire multiples common to all switch units.

Referring more particularly to Figures 1 and 2, there is illustrated a plurality of bare-wire multiple panels 20 mounted in a housing 10 which is preferably of metal. The housing 10 comprises essentially a back plate 11 and end plates 12 and 13 rigidly fastened together by means of screws, or in other suitable manner, to form a substantial structural assembly. An L-shaped member 8 and a Z-shaped member 9 are securely fastened to end plate 13 in suitable manner to provide bearing mountings for the secondary shafts 60 of the switch units and bearing mountings for one end of the primary shafts 55 of the switch units. Across the front of housing 10 are attached a top strip 14, a bottom strip 15 and one or more intermediate strips (not shown) to form mounting supports for one end of the bare-wire multiple panels 20.

The bare-wire multiple panels 20 are spaced at suitable intervals in housing 10, in the manner shown in Figures 1 and 2. Figure 1 provides spacing centers for ten panels, panels 1, 2 and 10 being shown in full and only center lines for panels 3 to 9, inclusive, it being understood that panels 3 to 9, inclusive, have been omitted to simplify the drawing. The end of each panel 20 adjacent back panel plate 11 is securely fastened to back plate 11 by means of two or more suitably spaced screws 16. The other end of each panel 20 is securely fastened to top strip 14, bottom strip 15 and each intermediate strip (not shown) by means of screws 17. It should be understood, however, that any other suitable means of anchoring the bare-wire multiple panels 20 in housing 10 can be employed, as desired.

Referring now to the front view (Figure 6) of bare-wire multiple panel 20, the frame of panel 20 is preferably fabricated of insulating material and is provided with a number of generally rectangular openings 21 arranged one above the other so that the frame has an appearance somewhat ladder-like. The number of openings 21 is dependent upon the number of horizontally disposed switch units to be mounted in the housing 10, one opening generally being required for each such switch unit. The frame of panel 20 may be provided with any number of openings 21, limited only to the desired maximum height of the frame, the vertical frame members of panel 20 in Figure 6 being shown broken to indicate this flexibility.

Panel 20 is equipped with 40 vertically disposed bare-wire conductors 22 mounted in four-conductor groups comprising, for example, 10 subscriber line multiples. It is obvious that each line multiple may include more than four bare-wire conductors or less than four bare-wire conductors, and also that the number of line multiple groups may be less or more than 10.

The vertically disposed bare-wire conductors 22 are secured to the bottom horizontal frame member of panel 20 and then successively pass through the bottom rectangular opening 21, slots in the next above horizontal frame member of panel 20, and so on through other rectangular openings 21 and slots in other horizontal frame members of panel 20 until the conductors pass through slots in the top horizontal frame member of panel 20. At this point the conductors rise a suitable distance above the top horizontal frame member of panel 20 where they are connected to terminals or wiring according to circumstance. The conductors 22 are held rigidly in the slots of the horizontal frame members of panel 20 by means of cross strips 23 fastened to the horizontal frame members of panel 20 as shown in Figure 6, and in the rectangular openings 21 the conductors 22 serve as wiper contacts for the related switch units. The conductors 22 consist of stiff bare wires or other suitable material preferably circular in cross section but may be of square, rectangular, or other cross section.

It will thus be seen that housing 10 is equipped with 10 bare-wire multiple panels 20 representing a total of 100 subscriber line circuits, each such line multiple comprising four bare-wire conductors 22. These 100 line multiple groups of housing 10 may be wired out to suitable terminals in any conventional manner, at which point the 100 line multiple groups may be cross-connected to the line and cut-off relay circuits of 100 subscriber lines, also in any suitable conventional manner. Since line and cut-off relay circuits are not part of the present invention, such relays need not be directly associated with housing 10 but may be mounted on relay racks or other suitable framework in any well-known manner. In passing, it should be understood that, according to preference or need, housing 10 may be equipped with more than or less than 10 bare-wire multiple panels 20: that each multiple group of each panel 20 may consist of more than or less than four bare-wire conductors 22; and that the line multiple groups of the panels 20 may represent circuits other than subscriber line circuits equally as well.

As previously indicated, each rectangular opening 21 of panel 20 accommodates one horizontally disposed wiper assembly 25 of one switch unit to provide means whereby this particular switch unit can connect its associated trunk circuit with any one group of the vertically disposed line multiples of panel 20. Each panel 20 is, therefore, fitted with one wiper assembly 25 for each switch unit mounted on housing 10, the wiper assemblies being securely mounted in any suitable manner.

The arrangement of wiper assembly 25 can best be seen in Figures 1, 5 and 7. Each wiper assembly 25 consists essentially of a horizontally disposed back mounting plate 24 which is securely attached to the framework of a panel 20 and housing 10, a horizontally disposed specially formed channel 26 for mounting the four trunk circuit conductors of the wiper assembly in position and for providing bearing supports 27 for the horizontally disposed actuator control member 29, and the vertically disposed wiper actuators 32 which are of insulating material.

The four trunk circuit conductors 35, 36, 37 and 38 (Figure 7) of wiper assembly 25 are insulated from each other and from channel 26 by means of suitable strip insulators, and are securely anchored in the top horizontal recess of channel 26. Each horizontally disposed trunk circuit conductor, such as 35, has 10 vertically disposed and spaced wiper members, such as 39, depending therefrom, each depending wiper member hanging down in front of one vertically disposed bare-wire conductor 22 of each of the 10 line circuit multiple groups, said vertically disposed conductor 22 being the same relative conductor of all 10 line circuit multiple groups. Each horizontally disposed trunk circuit conductor, such as 35, and its 10 depending wiper members are stamped and formed from a single piece of spring stock, as shown in Figures 8 and 9, and, therefore, this horizontal conductor serves to multiple the 10 depending wiper members together.

Figure 3:
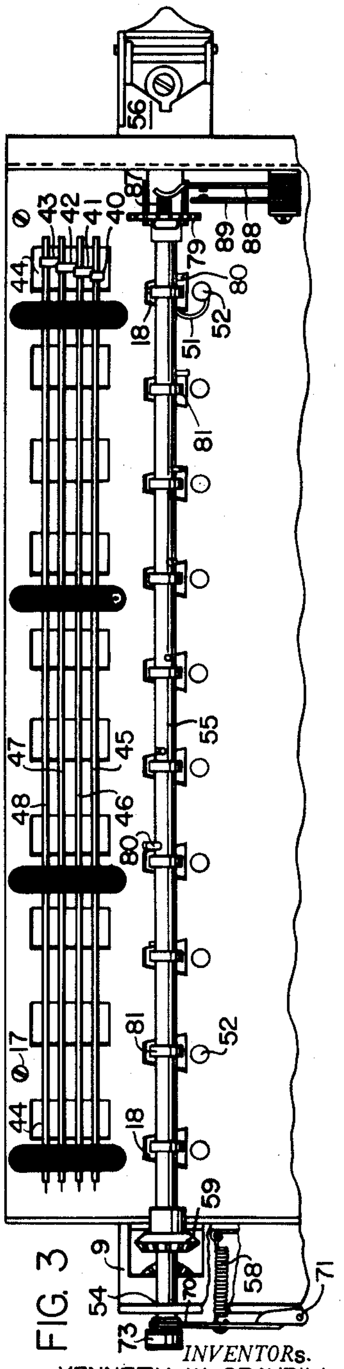
Figure 3 is a partial rear view, in elevation, showing the primary driving shaft of the uppermost switch unit and the horizontally disposed bare-wire multiple which connects all of the horizontally disposed wiper assemblies associated with the uppermost switch unit together.

The vertically disposed depending wiper members of the truck circuit conductors 35—38 are so tensioned that in the normal, or non-operated, position the free ends, such as 19, are close to but clear of the related line circuit conductor 22, as shown in Figure 7. When any group of four depending wiper members of trunk circuit conductors 35-38 are flexed in the manner to be described presently, the free ends of the four depending wiper members are pressed into sliding contacts with the four bare-wire conductors 22 of the particular line circuit multiple group. The right-hand ends 40—43 of the horizontally disposed trunk circuit conductors 35—38 pass through an opening 44 in black plate 11 of housing 10 and are soldered or otherwise connected to the four horizontally disposed conductors 45-48 insulatingly mounted on the rear of back plate 11, as shown in Figures 3 and 5. The horizontally disposed conductors 45—48 are connected to terminals or wiring of the related switch unit trunk circuit, as desired.

The switch units mounted on housing 10 lie in parallel horizontal planes one above the other in the manner shown in Figure 2. The number of switch units to be mounted on housing 10 is generally determined by the number of simultaneous connections required with the 100 multiple line groups of the 10 bare-wire multiple panels 20, limited only to the required maximum height of housing 10. The number of switch units mounted on housing 10 will, therefore, vary according to circumstances as, for example, 13 switch units are frequently associated with 100 line multiple groups as represented by the 10 panels 20. Each switch unit mounted on housing 10 is self-contained and independent of the other switch units.

Since in the present embodiment housing 10 is considered as being fitted with 10 bare-wire multiple panels 20, each switch unit on housing 10 is equipped with one wiper assembly 25 for each of the 10 panels 20, or a total of 10 wiper assemblies 25. The 10 wiper assemblies 25 for each switch unit on housing 10 are mounted on the 10 related openings 21 of the 10 panels 20 in the manner previously explained, and the four conductor terminals, such as 40-43, of each of the 10 wiper assemblies 25 are brought through openings 44 in back plate 11 of housing 10 and connected to the related four horizontaly disposed conductors, such as 45-48, in the manner also previously explained. In Figure 2, only the wiper assembly 25 associated with the first panel 20 to the left for each of the two indicated switch units is shown, but it should be understood that there are 10 wiper assemblies 25 for each of the two indicated switch units, one for each of the 10 panels 20 although only panels 1, 2 and 10 are shown in this figure. It will thus be seen that each switch unit of housing 10 has wiper facilities for connecting its trunk circuit to any of the 100 line multiple groups constituting the 10 panels 20.

Referring now to Figure 5, actuator control member 29 of each wiper assembly 25 has 10 suitably spaced lugs 31 for suspending 10 rectangular shaped wiper-actuating plates 32, through the media of 10 loosely fitting slots 33 in the plates 32. Each actuator plate 32 is fabricated of suitable insulating material and is of sufficient width to span the four related wipers 39. A generally tapered opening 49 in the lower portion of actuator plate 32 provides an operating channel for the related horizontally disposed slide bar 50 during the periods actuator plate 32 is in the normal, or non-operated, position, slide bar 50 being centrally located between the two inner wipers 39.

Actuator control member 29 of wiper assembly 25 is pivoted at 28 in the two bearing arms 27 in order that it may be rocked through a given angle for the purpose of lowering or raising the 10 suspended wiper actuators 32, as required. An operating arm 30 extending outwardly from control member 29 passes through an opening 18 in back plate 11 of housing 10. This operating arm 30 is actuated in either of opposite directions by corresponding longitudinal operations of the primary shaft 55 of the related switch unit to correspondingly rock control member 29. When operating arm 30 is actuated from its right-hand position as viewed in Figure 10 (rear of housing 10) to its left-hand position, as viewed in Figure 11, control member 29 correspondingly lowers the 10 actuator plates 32 which control member 29 controls, and when operating arm 30 is actuated from its left-hand position to its right-hand position, control member 29 correspondingly raises the 10 actuator plate 32. A toggle spring 51 anchored at post 52 and threaded through a hole (not shown) in the outer end of operating arm 30 provides means for retaining operating arm 30 in either of its opposite positions.

The manner in which operating arm 30 of wiper assembly 25 is retained in either of its two opposite positions by toggle spring 51 is shown in Figures 10 and 11. With wiper assembly 25 in the normal, or untripped, position, operating arm 30 is to the right in opening 18 as shown in Figure 10, and the operating-arm end of toggle spring 51 is to the right of the center of fixed post 52. The resulting pressure of toggle spring 51 retains operating arm 30 in its right-hand position. When operating arm 30 is actuated to the left in a manner to be described in a later paragraph, the operating arm end of toggle spring 51 is correspondingly forced to the left of the center of fixed post 52. As the operating arm end of toggle spring 51 passes to the left of the center of fixed post 52, toggle spring 51 assumes the position shown in Figure 11, and the resulting pressure of toggle spring 51 now retains operating arm 30 in the left-hand position in opening 18.

Each switch unit of housing 10 is equipped with a primary shaft 55; a pulse-operable motor 65 for driving shaft 55 through a suitable train of gears to cause shaft 55 to select one of its 10 wiper assemblies 25 according to the value of a received series of impulses; an electromagnet 56 for shifting shaft 55 longitudinally to the right from the normal position shown in Figure 1 (after shaft 55 has been rotated to select one of its wiper assemblies 25) to cause shaft 55 to trip, or operate, the selected wiper assembly 25 thereby to cause the 10 wiper actuators 32 of the selected wiper assembly 25 to be lowered to wiper-operating positions; and a helical spring 58 (best seen in Figure 3) tensioned to maintain shaft 55 in the normal position during all periods when electromagnet 56 is not energized and, therefore, provides motive power for shifting shaft 55 longitudinally back to the normal position whenever electromagnet 56 is de-energized (subsequent to having shifted shaft 56 to the right), thereby to cause the selected wiper assembly 25 to raise, or return, its 10 wiper actuators 32 to their respective normal positions. Gear sprockets 68 and 69 of the motor driving gear train are of sufficient width so that the relative follower gears 98 and 79 are always in mesh regardless of the longitudinal position of shaft 55.

Considering now the operation of the primary shafts 55 of the switch units, each primary shaft 55 is slidingly bearinged at a point such as 53 (Figure 1) in end plate 12 of housing 10 and also at a point such as 54 (Figures 1 and 3) in Z-shaped housing member 9. Electromagnet 56 has the tip of its armature 57 resting against the left-hand end of shaft 55, and provides motive power for shifting shaft 55 longitudinally to the right from the normal shaft position shown in Figure 1, the operation of electromagnet 56 overcoming helical spring 58.

Figure 4:
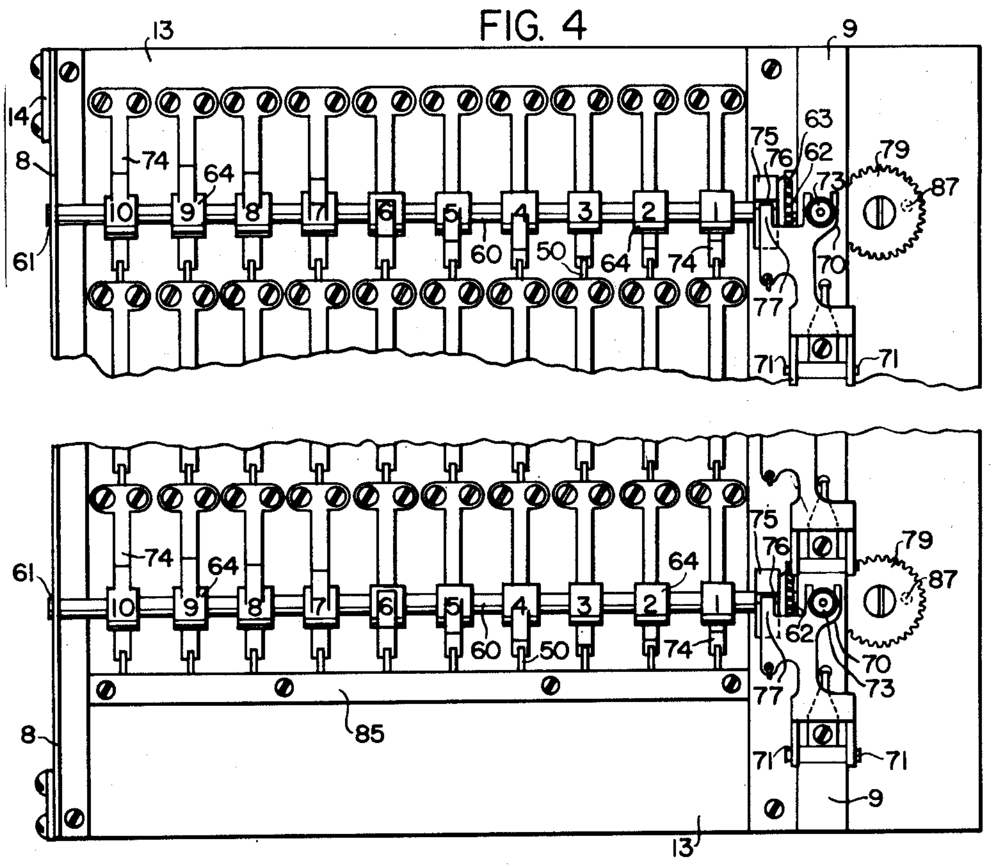
Figure 4 is a partial right end view, in elevation, showing the secondary, or cam, shafts of the uppermost and the bottom switch units and also the associated cams and cam followers.

The fork-shaped member 70 pivotally attached to housing member 9 as points such as 71 (Figure 4) engages a slot 72 in a collar 73 suitably attached to the right-hand end of shaft 55 (Figure 1). Fork-shaped member 70 and collar 73 may also be identified in Figure 3. One end of helical spring 58 is attached to housing member 9 in any suitable manner, and the other end of helical spring 58 is attached to forked member 70 (best seen in Figure 3). As previously explained, helical spring 58 is tensioned to maintain primary shaft 55 in the normal position during all periods when electromagnet 56 is not energized, through the medium of forked member 70.

Primary shaft 55 is fitted with 10 protruding studs, or cams, 80 spirally spaced across the length of shaft 55, each cam arranged for selecting one of the 10 wiper assemblies 25 of the switch unit. The 10 studs 80 are spaced on centers across the length of shaft 55 (Figure 1) equalling the spacings of the 10 wiper assemblies 25, and are so located that each stud 80 lies in a plane slightly to the left of operating arm 30 of the related wiper assembly 25. In addition, the 10 studs 80 are spaced one-eleventh of a revolution apart with respect to the circumference of shaft 55, thus leaving two-elevenths of a revolution spacing between stud #10 and stud #1. The double spacing between stud #10 and stud #1 provides a normal, or home, position for shaft 55 which is not fitted with a stud 80. Shaft 55 is so positioned with respect to the gear train of motor 65 that with motor 65 in its normal, or home, position stud #1 (the stud 80 related to the first wiper assembly 25 to the left in Figure 1) is located just below and short of being horizontally aligned with operating arm 30 of the first wiper assembly 25. Now when motor 65 is pulsed one step from its home position, the resulting rotating of shaft 55 one step moves stud #1 of shaft 55 sufficiently upward to horizontally align stud #1 with operating arm 30 of the wiper assembly 25. In a similar manner, stud #2 of shaft 55 would be horizontally aligned with operating arm 30 of the second wiper assembly 25 should motor 65 be pulsed two steps from its home position instead of one step, stud #3 of shaft 55 would be horizontally aligned with operating arm 30 of the third wiper assembly 25 should motor 65 be pulsed three steps from its home position instead of one step, etc., . . . 10 steps from its home position being required of motor 65 to align stud #10 of shaft 55 with operating arm 30 of the tenth wiper assembly 25. The aligning of any one of the 10 studs 80 with operating arm 30 of the related wiper assembly 25 constitutes a selection of that particular wiper assembly 25, to the exclusion of the other nine wiper assemblies 25.

Aftre primary shaft 55 has been rotated to align one of the studs 80 with one of the 10 operating arms 30 in the manner described in the preceding paragraph, electromagnet 56 is energized in desired manner to cause armature 57 to shift shaft 55 longitudinally to the right (Figure 1). This shifting of shaft 55 causes the aligned stud 80 to urge operating arm 30 of the selected wiper assembly 25 from the right-hand position shown in Figure 10 (when viewed towards the rear of housing 10) to the left-hand position shown in Figure 11. Toggle spring 51 retains, or locks, operating arm 30 of the selected wiper assembly 25 in the left-hand position as previously described and, therefore, shaft 55 can be further rotated without unlocking this operating arm 30. The locking of operating arm 30 in the left-hand position shown in Figure 11 retains actuator control member 29 of the selected wiper assembly 25 in the operated, or tripped, position wherein the associated 10 wiper-actuating plates 32 remain in the respective lowered, or wiper operating, positions.

Primary shaft 55 is further fitted with 10 spaced collars 81, one collar for each of the 10 associated wiper assemblies 25. Each collar 81 is located in a plane just to the right and clear of the respective operating arms 30 of the wiper assembly (Figure 1) and, since collar 81 presents a continuous cam around the circumference of shaft 55, the collar is always in a position to return the respective operating arm 30 from actuated position shown in Figure 11 to the normal position shown in Figure 10 should the operating arm 30 be in the actuated position of Figure 11. Now after a stud 80 of shaft 55 has been aligned with the respective operating arm 30 to select the related wiper assembly 25, and then shaft 55 has been shifted endwise by the energization of electromagnet 56 thereby to trip the operating arm 30, all in the manner previously explained, the subsequent de-energization of electromagnet 56 permits helical spring 58 to return shaft 55 to the normal position. As a result, the collar 81 adjacent the previously actuated operating arm 30 returns this operating arm 30 to the normal position shown in Figure 10, and the related control member is rocked in the opposite direction thereby to raise the 10 associated wiper-actuating plates 32 to the respective normal, or ineffective, positions. When viewed towards the rear of housing 10 (Figure 3), the 10 collars 81 in their normal positions approximately coincide with the vertical center lines of the respective openings 18 in back plate 11, but it should be understood that in this position the collars 81 are clear of the related operating arms 30. It should also be understood that when shaft 55 is shifted endwise by the energization of electromagnet 56 to move the studs 80 in the same direction, the collars 81 are also correspondingly moved in the same direction to clear the respective openings 18 and, therefore, cannot interfere with the actuation of a respective operating arm 30 from the normal position shown in Figure 10 to the actuated position shown in Figure 11.

Each switch unit of housing 10 is further equipped with a secondary, or cam, shaft 60 and 10 slide bar subassemblies, each comprising a horizontally disposed slide bar 50 and a vertically disposed cam follower 74. The cam followers 74 are adapted to be successively operated by the 10 cams 64 of shaft 60 for causing the related slide bars 50 to correspondingly operate the 10 lowered wiper-actuating plates 32 of a preselected wiper assembly 25 associated with the switch unit.

Secondary shaft 60 is bearinged in housing members 8 and 9 at points such as 61 and 62, respectively, (Figure 1). A miter gear 63 is fixedly attached to the end of shaft 60 nearest primary shaft 55 (Figure 1), and is adapted to be operatively engaged by miter gear 59, fixedly attached to the right-hand end of primary shaft 55, when primary shaft 55 is shifted longitudinally to the right by the energization of electromagnet 56. Secondary shaft 60 will, therefore, be rotated in unison with the primary shaft 55 whenever the energization of electromagnet 56 holds miter gears 59 and 63 in mesh and motor 65 is then additionally pulsed to cause a further rotation of primary shaft 55.

The 10 cams 64 of secondary shaft 60 are spirally spaced across the length of shaft 60 for successively operating the 10 respective cam followers 74 (Figure 1). The 10 cams 64 are spaced one-eleventh of a revolution apart with respect to the circumference of shaft 60, thus leaving two elevenths of a revolution spacing between cam #10 and cam #1. The double spacing between cam #10 and cam #1 provides a normal, or home, position for shaft 60 which is not fitted with a cam 64. The cams 64 are so located on shaft 60 that when shaft 60 is in the home position, cam #1 is just clear of the related cam follower 74 in a position to operate the cam follower when shaft 60 is rotated one step from its home position. Shaft 60 is fitted with a hub 75 having a slot 76 (Figures 1 and 4) which registers with the home position of shaft 60, and whenever shaft 60 is in the home position, or reaches the home position after having been rotated, a pawl 77 extending from fork-shaped member 70 (Figure 4) is caused to engage slot 76 of hub 75 thereby to lock shaft 60 against rotation.

Considering now the operation of secondary shaft 60, the energization of electromagnet 56, as previously indicated, causes miter gear 59 of primary shaft 55 to operatively engage miter gear 63 of secondary shaft 60. In addition, the endwise shifting of primary shaft 55 by the energization of electromagnet 56 causes forked-shaped member 70 to withdraw pawl 77 from slot 76 in hub 75 of secondary shaft 60, thereby freeing secondary shaft 60 for rotation. The subsequent receipt of a second series of impulses then operates motor 65 a corresponding number of steps, and primary shaft 55 and secondary shaft 60 are rotated in unison because they are now gear-coupled together. This further rotation of primary shaft 55 has no effect on the 10 wiper assemblies 25 associated with primary shaft 55, as previously explained. As secondary shaft 60 starts to rotate, helical spring 58 causes pawl 77 of member 70 to ride on the circumference of hub 75 of secondary shaft 60 and thereby retain the gear coupling of shafts 55 and 60 independent of the energization of electromagnet 56. Pawl 77 will now ride the circumference of hub 75 until secondary shaft 60 is sufficiently stepped to return it to the home position, whereupon helical spring 58 draws pawl 77 into slot 76 of hub 75, thereby to again lock secondary shaft 60 against rotation. Electromagnet 56 may, therefore, be deenergized any time after the first step of secondary shaft 60.

The rotating of secondary shaft 60 one step causes the first cam 64 to actuate the related cam follower 74, and should there be no further stepping of secondary shaft 60 then the first cam 64 continues to retain the related cam follower 50 actuated. Should secondary shaft 60 be rotated two steps instead of one step, then the first and second cams 64 successively actuate the related cam followers 74, and should there be no further stepping of secondary shaft 60 then the second cam follower 74 is retained actuated by the second cam 64. In like manner, the stepping of secondary shaft 60 three steps from the home position causes the successive actuation of the first, second and third cam followers 74 and the retention of the third cam follower 74 in the actuated position, etc., . . . 10 steps of secondary shaft 60 being required for successively actuating all 10 cam followers 74 and the retention of the tenth cam follower 74 in the actuated position.

Considering now the pulse-operable motor 65, this motor is shown in block form on the drawings, as any type of suitable uni-directional stepping motor which rotates its armature through a given angle responsive to each received impulse may be employed. Motor 65 is fitted with interrupter springs 66 and cam 67, as indicated in Figures 2 and 13, in order that it may be pulsed by subsequent self-interruption, after having been operated by received impulses, to return itself to the normal, or home, position. In the particular embodiment disclosed in this specification, motor 65 requires a total of 22 operations, or steps, to drive its shaft through one complete cycle, . . . for example, should motor 65 be operated six steps by one received series of impulses to correspondingly rotate primary shaft 55 six steps and then further operated four steps by a second received series of impulses to correspondingly rotate primary shaft 55 and secondary shaft 60 four steps in unison, then 12 impulses created by the interruptions of springs 66 through the medium of cam 67 are later required to "home" motor 65 to its home position. It should be understood that the illustrations of interrupter springs 66 and cam 67 are typical only, as the form and arrangements of these two units may vary according to the particular type of motor employed.

The 10 slide bars 50 of each switch unit mounted on housing 10 thread through clearance slots at points such as 97 (Figure 2) in end plate 13 of housing 10, and then thread through similar clearance slots such as 78 (Figure 6) of the 10 bare-wire multiple panels 20, and extend somewhat to the left beyond the first panel 20. (The slots in end plate 13 for the slide bars 50 should show in the end view of Figure 4 but have been omitted from the drawing to simplify the figure.) The bottom surfaces of the slots serve as bearings for the slide bars 50, and the side surfaces of slots 78 in the panels 20 are sufficiently near the related slide bars 50 to eliminate any possibility of a slide bar 50 accidentally contacting an adjacent bare-wire conductor 22. Hold-down plates 82 horizontally mounted across the first bare-wire multiple panel 20 just above each level of slide bars 50 as shown in Figure 2 restrict any undue upward motion of the slide bars 50.

The right-hand end of each slide bar 50 is undercut at a point such as 84 (Figure 2) to provide a vertical shoulder against which shoulder the upper end of the cam follower 74 located on end plate 13 just below the particular slide bar 50 serves as a backstop to limit the travel of the slide bar 50 to the right. Since there are no cam followers 74 located below the bottom level of slide bars 50, a horizontally disposed plate 85 is mounted across end plate 13 (Figure 4) to correspondingly limit the right-hand travel of the bottom level of slide bars 50. A slot 83 (Figure 2) near the right-hand end of each slide bar 50 accommodates the free end of the related cam follower 74 in order that the cam follower 74 can direct longitudinal travels of the slide bar 50 in either direction. Each cam follower 74 is preferably fabricated of spring stock and is so tensioned that, when it is clear of the related cam 64 of secondary shaft 60, it retains the associated slide bar 50 in the extreme right-hand, or normal, position.

Each slide bar 50 has 10 spaced shoulders 86 (Figure 2) extending upwardly, each shoulder 86 corresponding to one of the 10 wiper assemblies 25 of the particular switch unit. As previously indicated, each slide bar 50 threads through slotted openings 49 (Figure 5) in the 10 wiper actuating plates 32 with which it is associated, and the respective shoulders 86 of the slide bar 50 are aligned with but clear of the wiper-actuating plates 32. Now should all 10 wiper-actuating plates 32 associated with one slide bar 50 be in their respective normal, or raised, positions and then the related slide bar 50 and cam follower 74 sub-assembly be actuated to the left (Figure 2) by a rotation of secondary shaft 60, all 10 shoulders 86 will enter the slotted openings 49 of the ten wiper-actuating plates 32 without affecting any one of the 10 wiper-actuating plates 32. Should one of the 10 wiper-actuating plates 32, however, have been lowered responsive to the selection and tripping of the related wiper assembly 25 in the manner previously described, then the corresponding shoulder 86 of the associated slide bar 50 cannot enter slotted opening 49 of the lowered wiper-actuating plate 32 and, consequently, the lowered wiper-actuating plate 32 will be urged to the left (Figure 2) by the corresponding shoulder 86 of the associated slide bar 50, thereby to connect its related wipers 39 to the respective bare-wire conductors 22.

Each switch unit is also equipped with an "Off-Normal" contact spring sub-assembly which opens its contact when the related primary shaft 55 is in the home position, and closes its contact when the primary shaft 55 is stepped from the home position by motor 65, the contact then remaining closed until primary shaft 55 again reaches the home position. This off-normal contact spring sub-assembly may be identified in Figures 1 and 3 by the following described reference characters. Follower gear 79 is permanently meshed with sprocket gear 69 of primary shaft 55 and provides the medium for controlling the off-normal contact. A stud 87 of insulating material is suitably attached to follower gear 79 and retains contact spring 88 in a flexed condition during the periods primary shaft 55 in the home position, thereby to disconnect contact spring 88 from contact spring 89. As primary shaft 55 is rotated from its home position, follower gear 79 causes stud 87 to leave contact spring 88 and contact spring 88, therefore, makes contact with contact spring 89. The gear ratio of gears 69 and 79 is such that stud 87 does not again reach and again flex contact spring 88 until primary shaft 55 again reaches its home position. The off-normal contact of the switch unit is, therefore, open during the periods primary shaft 55 is in the home position, closes when primary shaft 55 is stepped from the normal position, and remains closed until primary shaft 55 again reaches the normal position. It is obvious that the off-normal contact spring sub-assembly of the switch unit may consist of any desired number and arrangement of contact springs.

Having disclosed the mechanical principles of the invention in the preceding paragraphs of this specification, reference will now be made to the simplified diagram shown in Figure 12 and the self-interruption homing circuit of motor 65 shown in Figure 13 for an explanation of the operation of each switch unit. In Figure 12 are shown two line multiple groups of vertically disposed bare-wire conductors 22 designated 91—90 and 01—00, respectively, and portions of the trunk circuits of two horizontally disposed switch units. A sufficient amount of mechanical parts are included to make the explanation readily understandable, but these mechanical parts are shown mostly in diagrammatic form rather than in elevation in order to reduce Figure 12 to its simplest form. The vertical conductors 22 of the two line multiple groups are shown with broken ends to indicate that those groups are not necessarily restricted to only two switch units, and the left-hand ends of the two horizontal slide bars 50 and 50' are shown broken to indicate that each switch unit may have access to more than two groups of line multiples. The self-interruption homing circuit shown in Figure 13 for motor 65 is typical only for the purpose of explanation, as any suitable or required arrangement can be employed equally as well.

Referring now to Figure 12, the upper switch unit is represented by slide bar 50, trunk circuit conductor 45, and the upper left-hand and the upper right-hand wiper assemblies respectively associated with conductors 22 of line multiple groups 91—90 and 01—00. Wiper-actuating plate 32 of the upper left-hand wiper assembly is shown in the lowered position to indicate that the left-hand wiper assembly has been selected and tripped by the upper switch unit in the manner explained in previous paragraphs of this specification. Wiper-actuating plate 32 of the upper right-hand wiper assembly is shown in the normal, or raised, position to indicate that the right-hand wiper assembly and all other wiper assemblies of the upper switch unit except the left-hand wiper assembly cannot at this time be selected and tripped by the upper switch unit. Similarly, the lower switch unit is represented by slide bar 50', trunk circuit conductor 45', and the lower left-hand wiper assembly and the lower right-hand wiper assembly respectively associated with conductors 22 of line multiple groups 91—90 and 01—00. Wiper-actuating plate 32' of the lower right-hand wiper assembly is shown in the lowered position to indicate that the lower right-hand wiper assembly has been selected and tripped by the lower switch unit. Wiper-actuating plate 32' of the lower left-hand wiper assembly is shown in the normal, or raised, position to indicate that left-hand wiper assembly and all other assemblies of the lower switch unit except the right-hand wiper assembly cannot at this time be selected and tripped by the lower switch unit.

It will thus be seen that the upper switch unit is now in a position to connect its trunk circuit (represented by conductor 45) with one of the line multiples (represented by the left-hand vertical conductor 22) of the group 91—90, and that the lower switch unit is correspondingly in a position to connect its trunk circuit (represented by conductor 45') with one of the line multiples (represented by the right-hand vertical conductor 22) of the group 01—00. It will also be observed that the upper switch unit cannot connect its trunk circuit (conductor 45) with the line multiple of the group 01—00 represented by the right-hand vertical conductor 22 because the right-hand wiper-actuating plate 32 is in the raised, or ineffective, position. Similarly, the lower switch unit cannot connect its trunk circuit (conductor 45') with the line multiple of the group 91—00 represented by the left-hand vertical conductor 22 because the left-hand wiper-actuating plate 32' is in the raised, or ineffective, position.

Now assuming that secondary shaft 60 of the upper switch unit rotates cam 64 in the manner described in previous paragraphs, to cause slide bar 50 to move to the left, the right-hand shoulder 86 of slide bar 50 passes underneath the right-hand wiper-actuating plate 32 without effect. The left-hand shoulder 86 or slide bar 50, however, presses against the lower portion of the left-hand wiper-actuating plate 32 (because this plate 32 is in the lowered, or effective, position) to urge the left-hand wiper 39 into contact with the left-hand vertical conductor 22, thereby connecting the conductor 45 with the conductor 22. In a similar manner, the rotating of cam 64' by secondary shaft 60' of the lower switch unit causes slide bar 50', through the medium of the right-hand shoulder 86', to operate the right-hand wiper-actuating plate 32', thereby to connect conductor 45' with the right-hand conductor 22, it being understood that the left-hand shoulder 86' of slide bar 50' passes underneath the left-hand wiper-actuating plate 32' without effect.

Referring to Figure 13, the principles of the self-interruption homing circuit arrangement for motor 65 will now be explained. The interrupter springs and associated cam operable by the shaft of motor 65 are identified by the reference characters 66 and 67, respectively. Reference character 90 identifies the effective operating winding of motor 65, and characters 87, 88 and 89 the stud and the two contact springs of the switch unit's off-normal contact spring sub-assembly. Relays 91 and 94 are similar to the well-known "line" and "release" relays of a Strowger switch, for example, and are controlled over a calling line in well-known manner. The circuit for the self-interruption of motor 65 is open at the off-normal contact springs 88 and 89 during all periods when motor 65 is in its normal, or home, position as previously explained in this specification.

When motor 65 steps primary shaft 55 of the switch unit from its home position responsive to a series of impulses impressed upon motor 65 in desired manner, stud 87 (Figure 13) leaves contact spring 88 in the manner previously explained and, consequently, contact spring 88 makes contact with contact spring 89. The contacting of springs 88 and 89, however, does not complete the self-interruption homing circuit of motor 65 because the operation of line relay 91 in well-known manner when the switch unit was "seized" by the calling line, for example, opens another point in the homing circuit at armature 93 while contact spring 88 is still flexed away from contact spring 89 by stud 87. The homing circuit remains in the ineffective condition during the remainder of the operation of the switch unit and until the calling line opens the loop circuit of line relay 91. Responsive to the restoring of line relay 91, armature 93 closes a point in the homing circuit and, after a short interval, release relay 94 restores in well-known manner to complete the homing circuit at armature 95. The completed homing circuit of motor 65 may now be traced from ground, armature 93, armature 95, contact springs 89 and 88, interrupter springs 66, winding 90 of motor 65 to battery. Motor 65 correspondingly starts stepping its shaft and, by means of cam 67 operated in a manner determined by the particular type and design of motor 65, causes interrupter springs 66 to open the homing circuit. As motor 65 advances its shaft one step, cam 67 is caused to close the interrupter springs 66, and motor 65 advances its shaft another step, with corresponding opening and closing of interrupter springs 66. In this manner, motor 65 continues to step its shaft until primary shaft 55 reaches its home position. When primary shaft 55 reaches its home position, stud 87 flexes contact spring 88 away from contact spring 89, thus opening the homing circuit. Motor 65 is now in its home position.

While there has been described what it at present considered to be a preferred embodiment of the invention, it should be understood that various modifications may be made in the structure thereof, and it is contemplated in the appended claims to cover all such modifications as fall within the true spirit and scope of the invention.

What is claimed is:

1. In an automatic switching device, a plurality of bare conductors arranged in rows substantially parallel to each other, a common conductor comprising a metallic strip fixed across said plurality of bare conductors but having no normal connections thereto, a plurality of contact members extending from said common conductor strip each adapted to be connected to one of said bare conductors, a plurality of actuators for operating said plurality of contact members, said actuators normally in positions ineffective for operating said contact members, a rotatable bar having a depression in its surface, a latch engaging said depression to lock said bar against rotation, means for moving all said actuators to effective operating positions simultaneously preparatory to causing the operation of any of said contact members, means for ejecting said latch from said depression in said bar to free said bar for rotation, means for rotating said freed bar a fixed distance, means responsive to said rotation of said bar for operating one of said actuators in said operating position to urge one of said contact member into contact with one of said bare conductors, thereby to connect said common conductor to said last mentioned bare conductor.

2. In an automatic switching device as claimed in claim 1 wherein said means for rotating said freed bar includes an impulse operated motor, said motor operating responsive to one received impulse to rotate said freed bar said fixed distance.

3. The automatic switching device claimed in claim 1, and restoring means for rotating said bar further, and means operated responsive to the operation of said restoring means for retracting said one operated actuator to cause the retraction of said one contact member, thereby to disconnect said common conductor from said last mentioned bare conductor.

4. In an automatic switching device, a plurality of contacts, a plurality of contact actuators, a first movable shaft, a second movable shaft, means for locking said second shaft against movement, impulse-operable means responsive to a received impulse for moving said first shaft in one direction to select said plurality of contact actuators, means for shifting said moved first shaft in a different direction, means responsive to said shifting of said moved first shaft for operatively conditioning all said selected contact actuators preparatory to causing the operation of any one of said contacts, means responsive to said shifting of said moved first shaft for disabling said locking means to unlock said second shaft for movement, means responsive to said shifting of said moved first shaft for coupling said shifted first shaft to said second unlocked second shaft, said impulse-operable means responsive to another received impulse for moving said two coupled shafts in unison, and means responsive to said unified movement of said two coupled shafts for operating one of said conditioned contact actuators to correspondingly operate one of said contacts.

5. The automatic switching device claimed in claim 4 together with means for additionally moving said two coupled shafts in unison to return said coupled second shaft to its normal position, means for restoring said third means, means associated with said first means operated responsive to said restoration of said coupled second shaft for locking said restored coupled second shaft in its normal position, means operated responsive to the restoration and locking of said coupled second shaft for causing a second conditioning of said one operated contact actuator, means operated responsive to the second conditioning of said one operated contact actuator for causing said one operated contact to restore.

6. The automatic switching device claimed in claim 5 together with means associated with said first means and operated when said second shaft is returned to normal for uncoupling said first shaft from said locked second shaft and for returning said uncoupled first shaft to its normal position, and means responsive to said restoration of said uncoupled first shaft for restoring said second conditioned contact actuator and said other conditioned contact actuators to respective normal positions.

7. In an automatic switch, groups of contacts, groups of contact actuators associated with said groups of contacts, a rockable element spanning each said group of actuators, a rotatable shaft, pulse-operable means responsive to received pulses for rotating said shaft according to the value of said received pulses, means responsive to said rotation of said shaft for selecting one of said rockable elements, means for shifting said rotated shaft endwise, means responsive to said shifting of said rotated shaft for rocking said one selected element, all the actuators in the group of actuators spanned by said one selected element moving to respective second positions in response to said rocking of said one selected element, said pulse-operable means further operated responsive to another received pulse, means responsive to said further operation of said pulse-operable means for operating one of said actuators moved to said second position, said operation of said one actuator moved to said second position for causing the operation of one of said contacts in the group of contacts associated with said group of actuators moved to said second positions.

8. The automatic switch claimed in claim 7, and means for disabling said one operated actuator to cause the restoration of said one operated contact.

9. In an automatic switch, groups of contacts, groups of actuators associated with said groups of contacts, a rockable element common to each said group of actuators, a first shaft, a second shaft, pulse-operable means responsive to received pulses for rotating said first shaft according to the value of said received pulses, means responsive to said rotation of said first shaft for selecting one of said rockable elements, means for shifting said rotated first shaft endwise, means responsive to said shifting of said rotated first shaft for rocking said one selected element, said rocking of said one selected element causing all the actuators of the group of actuators to which said rocked element is common to move to respective second positions, means responsive to said shifting of said rotated first shaft for rotatively coupling said two shafts together, said impulse-operable means responsive to another received pulse for rotating said two coupled shafts, means responsive to said rotation of said two coupled shafts for operating one of said actuators in said second position, said operation of said one actuator causing the operation of the associated contact.

10. The automatic switch claimed in claim 9 together with means for additionally operating said pulse-operable means to further rotate said two coupled shafts until said coupled second shaft reaches its normal position, means responsive to said restoration of said coupled second shaft for retracting said one operated actuator to cause the restoration of said one operated contact, means for restoring said third means, means operated on the restoration of said coupled second shaft for uncoupling said first shaft from said second shaft and for returning said uncoupled first shaft to its normal position, and means responsive to said restoration of said uncoupled first shaft for restoring said one retracted actuator and said other actuators in said second positions to normal.

KENNETH W. GRAYBILL.
HANS SENGEBUSCH.

REFERENCES CITED

The following references are of record in the file of this patent:

UNITED STATES PATENTS

| Number | Name | Date |
|---|---|---|
| 1,551,190 | Craft | Aug. 25, 1925 |
| 2,137,514 | Voss | Nov. 22, 1938 |
| 2,238,458 | Waller | Apr. 15, 1941 |
| 2,322,219 | Boswau | June 22, 1943 |
| 2,412,257 | Gillings | Dec. 10, 1946 |
| 2,479,678 | Graybill | Aug. 23, 1949 |
| 2,541,354 | Graybill | Feb. 13, 1951 |

FOREIGN PATENTS

| Number | Country | Date |
|---|---|---|
| 67,060 | Sweden | Oct. 15, 1925 |